Jan. 10, 1950   P. RIME-BRUNEAU   2,494,203
DEVICE FOR TRANSMITTING ROTARY MOTION
Filed July 7, 1945

INVENTOR
PAUL RIME-BRUNEAU
BY *[signature]*
ATTORNEYS

Patented Jan. 10, 1950

2,494,203

UNITED STATES PATENT OFFICE 2,494,203

DEVICE FOR TRANSMITTING ROTARY MOTION

Paul Rime-Bruneau, Paris, France, assignor to the Firm Societe d'Exploitation des Procedes Dabeg, Paris, France Application July 7, 1945, Serial No. 603,720
In France June 25, 1941

Sections 1 and 11, Public Law 690, August 8, 1946
Patent expires June 25, 1961

1 Claim. (Cl. 74—69)

This invention relates to a device for taking a rotary movement for locomotives and similar applications.

It is often necessary to take a rotary movement on a locomotive either for actuating valve motion members or for moving auxiliary apparatuses such as: speed indicators or registering apparatuses, pumps, dynamos and the like. Such takings of rotary movement must generally be homokinetic with the movement of the driving axles, which excludes transmission thru belts or the like.

On the other hand, takings of movement on the axles are not practicable or simply not practical under the locomotive between the wheels either owing to the presence of inner connecting rods or for reasons of inaccessibility. Of course, driving or connecting rods are also provided outwardly, but it is always possible, by means of the known counter-cranks, to obtain a rotating piece fast with the axle outside the mechanism. Now, said rotary piece partakes of the vertical movement of the axle due to the deflection of the springs used for the suspension of the frame. If it is desired that the movement taking box under consideration is secured on the frame it is necessary to interpose between the rotary piece and the box a deformable device or universal joint which transmits the movement of rotation exactly irrespective of the vertical displacements or inclinations of the axle.

Various arrangements have already been proposed for takings of movement of this kind, but these arrangements generally offer the disadvantage of a certain fragility as well as that of requiring a considerable place.

The device according to the invention, which remedies the said disadvantages comprises, in combination, a driving device arranged on the outer face of one of the driving wheels of the locomotive, said device being constituted, for instance, by a counter-crank or the like secured on the outer end of the crank-pin of one of the driving wheels and comprising a radial arm, that is to say an arm the extended or non-extended axis of which intersects the extended axis of the corresponding axle, said arm receiving a slide provided with two lateral trunnions rotatably mounted in the legs of a stirrup itself provided with two extension-pieces perpendicular to the radial arm, said extension-pieces being mounted so as to be able to rotate and to slide in sockets fast with the axis to be driven, the whole for the purpose of creating a strong unit requiring little space in the direction perpendicular to the track, where the requirements of the gauge reduce the place which is available.

A form of execution of a device according to the invention is shown by way of example in the appended drawing, in which.

Figure 1:
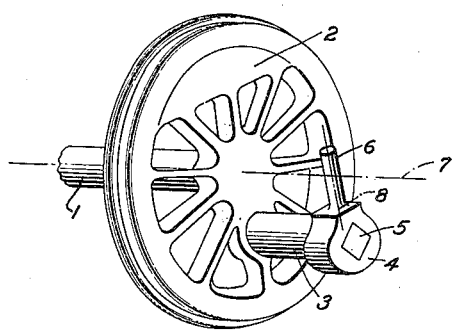
Figure 1 is a perspective view showing one of the driving wheels of a locomotive and the arrangement of the driving device with its radial arm.

According to the invention the driving device comprising a radial arm is made in the form shown in Figure 1 which is a perspective view showing a portion of a driving axle 1, the adjacent driving wheel 2 and the crank 3, the connecting rods being supposed removed. Said device comprises a head 4 keyed on the end of the crank by means of the square 5 or by any other means and carrying a cylindrical arm or rod 6 the axis of which is in a radial direction and perpendicular to the axis 7 of the axle and meets with this latter axis at 8.

Figure 3:
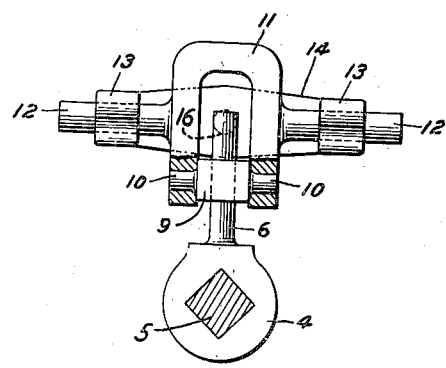
Figure 3 is a front view according to 3—3 of Figure 2.
Figure 2:
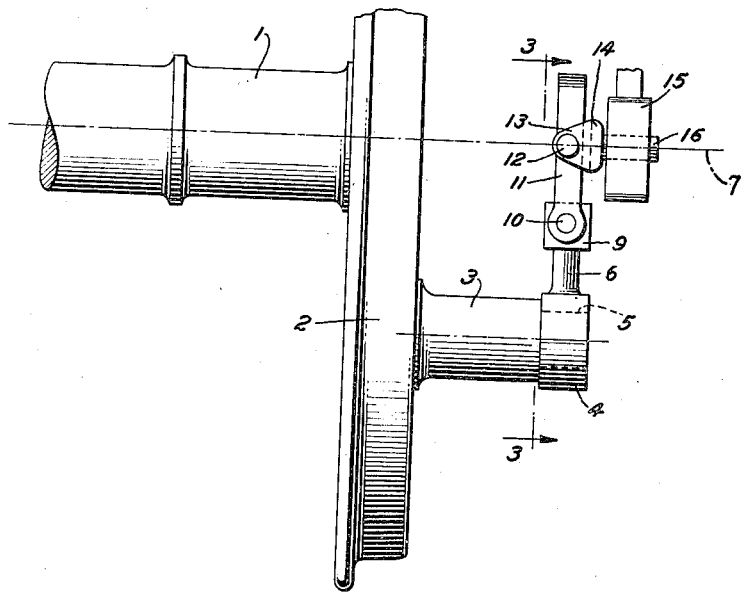
Figure 2 is a side view showing the joint according to the invention on a larger scale.

Mounted on the radial arm 6 (Figures 2 and 3) is a socket 9 which slides and, if necessary, rotates on said arm and is driven with the latter in the general rotation. Said socket carries two trunnions 10. A stirrup 11 is pivotally mounted on said trunnions. Two cylindrical extension pieces 12 are provided the axis of which is perpendicular to that of the arm 6. Two sockets 13 fast with an arm 14 surround said extension pieces 12 on which they can slide and rotate. Lastly, the arm 14 is fast with an axis 16 which enters the movement taking box 15 the inside of which is not shown and which comprises all the necessary members, gears and the like according to its destination. Said box is rendered fast with the general frame of the locomotive by a support, not shown.

It can easily be seen that owing to the sliding movements of the rings 9 and 13 the axle can rise or go down freely with respect to the box 15. Furthermore, the possible rotations of said rings 9 and 13 allow, in the like manner, inclinations of the axle 1 with respect to the frame of the locomotive. Lastly, the device according to the invention makes its possible, thru the articulations 10 with 11 and 12 with 13, to leave the axle a possibility of axial displacement in the passage of curves.

Furthermore, one sees that every rotation of the axle entails an equivalent rotation of the axis 16 which was to be obtained.

The above described diagrammatical device can be completed, according to its various applications, by all useful accessories such as: axle brass pieces with balls for the rotary rings turning and sliding, various lubricators, sheaths or felt pieces as protection against dust, dismountable parts for facilitating the machining and putting in position of the pieces and the like.

I claim:

A device for transmitting a rotary movement from a locomotive driving axle to a part to be driven therefrom, comprising, in association with a locomotive driving wheel crank, a counter-crank arm adapted to be secured on a driving wheel crank and extending radially so that its axis intersects the axis of the driving wheel axle, a member longitudinally slidable on said arm and having a pair of lateral trunnions, a stirrup having two legs in which said trunnions are pivotally mounted, said stirrup having two extension pieces perpendicular to the axis of said arm, and a driven member having journals in which said extension pieces are mounted with freedom for rotation and sliding movement.

PAUL RIME-BRUNEAU.

No references cited.